July 11, 1939.　　　C. STRACENER　　　2,165,734

CAST BAIT OR BUG

Filed Aug. 11, 1938

Inventor

Charles Stracener

By Watson E. Coleman

Attorney

Patented July 11, 1939

2,165,734

UNITED STATES PATENT OFFICE 2,165,734

CAST BAIT OR BUG

Charles Stracener, Sweetwater, Tex.

Application August 11, 1938, Serial No. 224,367

1 Claim. (Cl. 43—48)

This invention relates to a cast bait or bug especially adapted for use in fishing for bass.

The invention has for an object to provide a device of this kind which facilitates casting and which drags along the bottom of the stream or lake in simulation of a snake doctor or dragon fly.

It is also an object of the invention to provide a cast bait or bug constructed in a manner to effectively withstand hard usage and which is of a character to eliminate the use of a spinner and which is of a character to cause the hook to be disposed upwardly.

Another object of the invention is to provide a cast bait or bug including wings at the forward and rear end portions thereof to prevent the device from hanging onto a bush or other foreign matter within the water.

The invention consists in the details of construction and in the combination and arrangement of the several parts of my improved cast bait or bug whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein.

Figure 1:
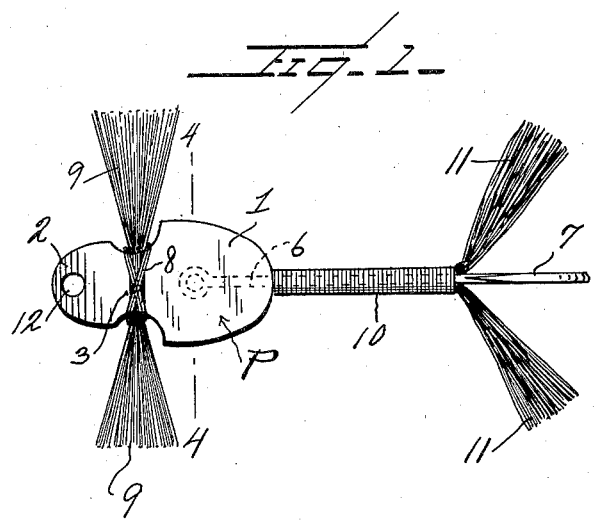
Figure 1 is a view in top plan of a cast bait or bug constructed in accordance with an embodiment of my invention.
Figure 2:
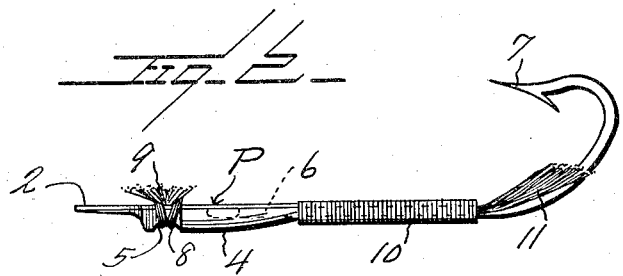
Figure 2 is a view in side elevation of the device as illustrated in Figure 1.
Figure 3:
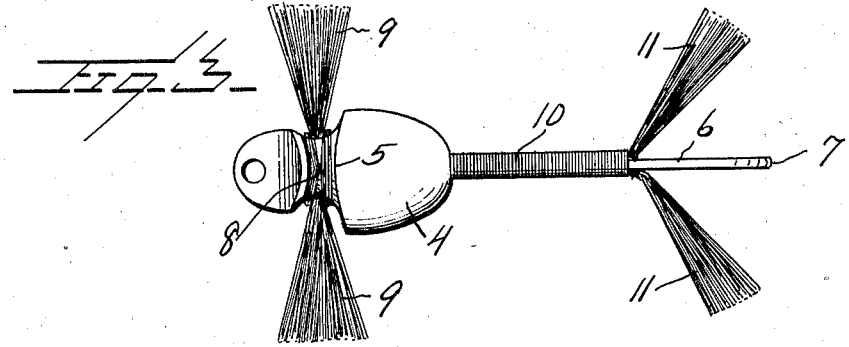
Figure 3 is a view in bottom plan of the device as herein disclosed.
Figure 4:
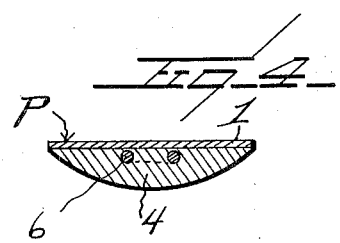
Figure 4 is a sectional view taken substantially on the line 4—4 of Figure 1.

As disclosed in the accompanying drawing, my improved cast bait or bug comprises a plate P of metal and preferably brass or copper. The rear portion 1 of this plate is of a shield design to simulate in a general way the body of a snake doctor, dragon fly or kindred bug or insect and the forward portion 2 of the plate P is substantially circular in simulation of the head of the bug or insect. These portions 1 and 2 are connected by an interposed neck portion 3. Disposed over the under portion of the plate P is a weighted lamination 4 preferably solder. The portion of the lamination 4 overlying the rear portion 1 of the plate P is convex in cross section while the portion of the lamination 4 overlying the neck portion 3 is formed to provide a groove 5. The lamination 4 in advance of this groove 5 is abruptly reduced in thickness from a point closely adjacent to the groove 5 to the outer extremity of the portion 2.

Secured to the rear extremity of the portion 1 of the plate P at the transverse center thereof and through the medium of the applied lamination 4 is the forward end portion of an elongated shank 6 provided at its outer or rear extremity with the upstanding and forwardly facing hook member 7. The weighted lamination 4 in addition to facilitating the movement of the bait or bug over the bottom of a stream or lake also assures the hook 7 being maintained upwardly.

Secured around the neck portion 3 of the plate P and received within the groove 5 are the threads 8 of any desired material and which provide means for effectively securing to the upper face of the plate P the central portion of a cluster of elongated cow tail hairs or the like, said cluster being of a length to project a material distance beyond opposite sides of the plate P and outwardly spread to provide the front wings 9.

Wrapped around the major portion of the shank 6 is the thread 10 which also engages the central portion of a second cluster of cow tail hairs or the like, the extremities of which cluster are disposed in rearward divergence to provide tails 11 for the bait or bug. The wings and tails may be colored as desired as also the threads.

The wings 9 and tails 11 provide further simulation of a snake doctor or dragon fly and also provide effective means to prevent the cast bait or bug becoming caught on brush or other matter within the water.

The forward extremity of the portion or head 3 of the plate P is provided with an opening 12 to afford an eye whereby proper connection may be had with a fishing line.

In the use of my improved device it is cast out to the water and permitted to sink to the bottom. The line, as by quickly turning the reel, is given a series of jerks and the device permitted to settle down again. This is repeated until a strike. The snake doctor or dragon fly which is a common insect in water where bass are found, has a forked tail while in the water before he comes to the surface upon maturity to fly. My improved device when under water gives a close simulation of such an insect and which insect is greatly relished by bass.

From the foregoing description it is thought to be obvious that a cast bait or bug constructed in accordance with my invention is particularly well adapted for use by reason of the convenience and facility with which it may be assembled and used, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A cast bait or bug comprising a plate having its rear portion of a shield-like form and its forward portion substantially circular with an intermediate neck portion, a weighted lamination disposed over the under surface of the plate, a hook having a shank secured to the rear extremity of the plate at the transverse center thereof with the hook disposed upwardly with respect to the top of the plate, hair clusters secured to the neck portion of the plate and extending beyond opposite sides of the plate to provide wings, and hair clusters carried by the shank of the hook and extending rearwardly therefrom in divergence.

CHARLES STRACENER.